Nov. 4, 1952 D. H. SHOOTER ET AL 2,616,186
TOE IN OR TOE OUT WHEEL ALIGNMENT GAUGE
Filed Oct. 7, 1949
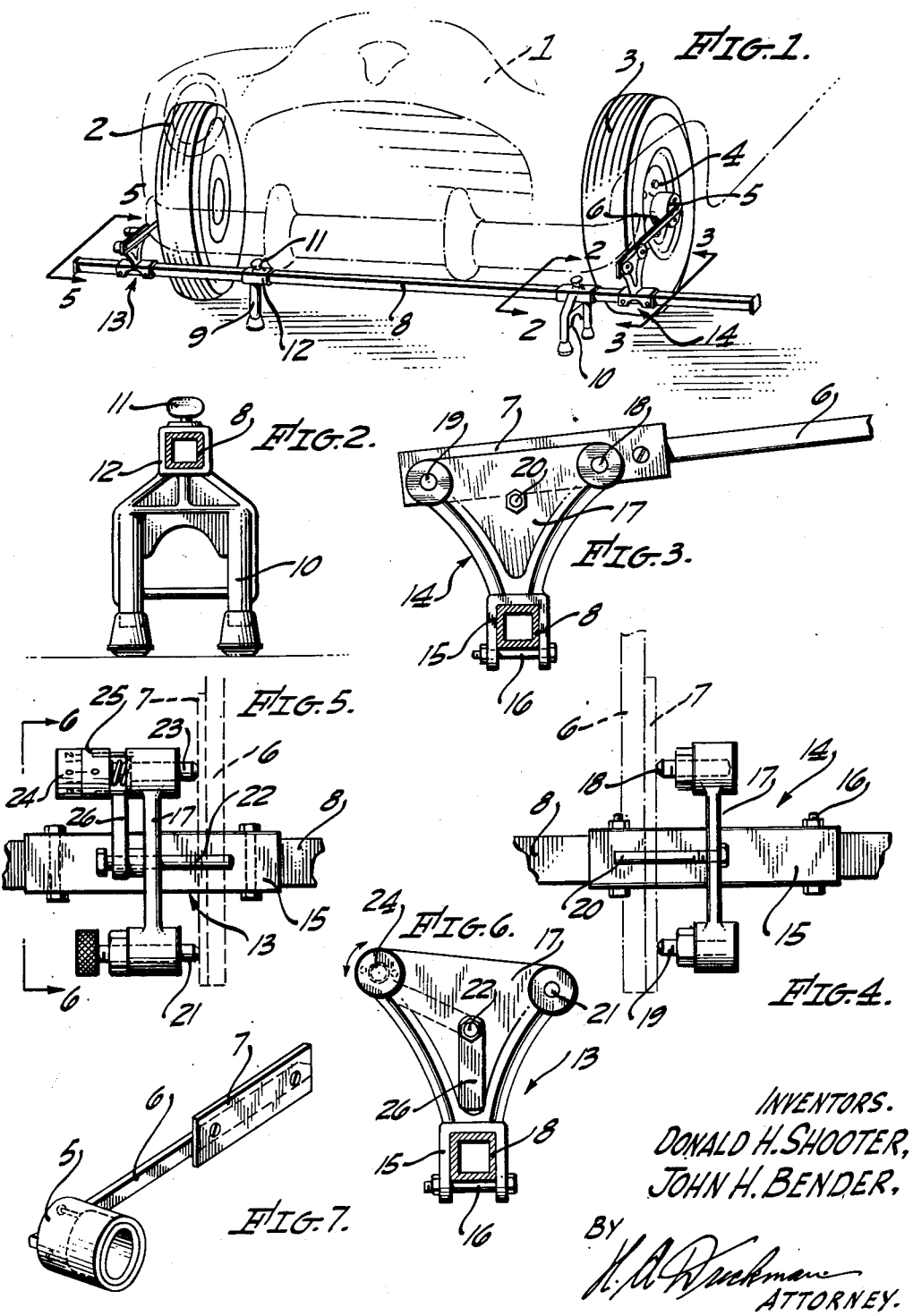
INVENTORS.
DONALD H. SHOOTER,
JOHN H. BENDER,
BY
ATTORNEY.

Patented Nov. 4, 1952

2,616,186

UNITED STATES PATENT OFFICE 2,616,186

TOE IN OR TOE OUT WHEEL ALIGNMENT GAUGE

Donald H. Shooter, Arcadia, and John H. Bender, Maywood, Calif.

Application October 7, 1949, Serial No. 120,086

2 Claims. (Cl. 33—203.17)

This invention relates to an alignment gauge of the type whereby the front wheels of an automobile may be gauged to determine if they toe in or toe out, and also the amount of such toe. It is well known in automotive practice that the front wheels of an automobile must toe in a certain amount so that the car will track properly.

An object of our invention is to provide a gauge of the character stated, in which a magnetic chuck engages the hub of the wheel, this chuck being provided with a blade which acts as a means to measure the toe in or toe out of the wheel.

Another object of our invention is to provide a gauge of the character stated, in which the blades attached to the vehicle wheels are aligned with riders which are adjustably mounted on a horizontal rod.

A feature of our invention is to provide a gauge of the character stated, in which the toe in or toe out of the front wheels of a vehicle is determined by the gauge blade extending forwardly, and without having to reverse the position of the blades to determine the amount of correction which is required to properly position the front wheels.

Another feature of our invention is to provide a novel gauge of the character stated, which includes a portable rod, which can be placed in front of the wheels of the vehicle, this rod carrying riders, and with blades detachably mounted on the front wheels, these blades engaging the riders to determine the amount of toe in or toe out of the wheels.

Other objects, advantages and features of invention may appear from the accompanying drawing, the subjoined detailed description and the appended claims.

In the drawing—

Figure 1 is a perspective view of our gauge, positioned on a vehicle.

Figure 2 is a sectional view taken on line 2—2 of Figure 1.

Figure 3 is a sectional view taken on line 3—3 of Figure 1.

Figure 4 is a top plan view of one of the riders showing a fragment of the rail upon which it rides.

Figure 5 is a top plan view of the second rider.

Figure 6 is a sectional view taken on line 6—6 of Figure 5.

Figure 7 is a perspective view of one of the wheel engaging chucks.

Referring more particularly to the drawing, the vehicle 1 is provided with front wheels 2 and 3, each wheel including a metal hub 4. A magnetic cup or chuck 5 fits over the front spindle and is magnetically secured to the hub 4 and particularly to the outer machined face of the hub, as shown in our Patent No. 2,532,593, issued December 5, 1950, and entitled Means for Measuring Wheel Alignment. The particular construction of the chuck 5 or of the magnet therein is, therefore, not a part of this invention, except as to the combinations which will be subsequently described and claimed.

A blade 6 is fixedly secured to each of the chucks 5 and projects forwardly of the vehicle, substantially as shown in Figure 1. It is to be noted that in our present construction, the blade 6 always extends forwardly and it is not necessary to reverse the position of this blade, namely, to direct it rearwardly in order to properly align or gauge or position the front wheels of the vehicle. If desired, a flat plate 7 can be attached to the outer end of the blade 6 for the purpose of providing an accurate surface against which the gauge pins are pressed, as will be subsequently described.

A rail or rod 8 is positioned immediately in front of the wheels 2 and 3, and this rail is preferably rectangular in shape, although other shapes may be utilized, if desired. The rail 8 is positioned above the level of the floor by spaced feet 9 and 10. The feet 9 and 10 are each secured to the rail 8 by means of a set screw 11, which extends through an integral sleeve 12 on each of the feet and bears against the rail. The foot 9 is preferably of a single prong type, whereas the foot 10 has two prongs. The rail 8 is also adjustable in either foot 9 or 10 to suit the particular tread or size of the vehicle.

A pair of riders 13—14 are mounted on the rail 8, and the rider 13 is slidable lengthwise of the rail 8, while the rider 14 is preferably fixed or is not slidable on the rail. Each rider consists of a saddle 15, which fits over the rail 8 and bolts 16 extend through the saddle and under the rail, thus holding the saddle in position, and if the bolts 16 are tightened, the rider will be held immovable on the rail 8. A plate 17 projects upwardly from the saddle 15 and this plate is an integral part of the saddle and arranged at right angles thereto.

The rider 14 is provided with a pair of pins 18—19, and these pins are fixed relative to the plate 17. A third pin 20 also projects from the plate 17 and this last pin acts as a support for one of the blades 6, so that the blade will properly engage both of the pins 18—19 when the proper toe of the wheel 3 is accomplished. The rider 13 is provided with a pin 21, which is not adjustable relative to the blade 17, and is also provided with a pin 22, which is fixed and which acts as a support for the blades 6, substantially as shown.

An adjustable pin 23 screws into the blade 17 and is rotated by the calibrated knob 24. The knob 24 rotates relative to a collar 25, which is spring pressed against the knob 24 and is not rotatably held relative to the blade 17. The collar 25 acts as the fixed part of a scale by means of which the amount of toe of the wheel can be determined, as will be further described. By rotating the knob 24, the pin 23 can be moved horizontally to engage the blade 6, and by reading the calibrations on the knob the amount of toe in or toe out can be determined.

To set the knob 24 on its zero position, we provide a finger 26, which is pivotally mounted on the pin 22, and the thickness of this finger is accurately measured so that when it is swung into the position shown in Figure 5, that is, under the collar 25, the knob 24 will be zeroed. It will be evident that the pins 18, 19 and 21 must be accurately positioned at all times relative to the rail 8 and, therefore, the side faces of the rail 8 are preferably accurately grounded so that the riders 13 and 14 will always be at right angles to the rail and irrespective of their relative positions on this rail.

Operation

In operation, the chucks 5 are placed on each of the front wheels 3 and 4, and the magnets in the chucks will hold the blade 6 in a horizontal position and extending forwardly. The blade 6 will be accurately held in this position due to the fact that the chuck 5 is pressed against the machined surface of the hub 4. The rail 8 is now placed in front of the wheels 2 and 3, and the rider 14 is moved until the pins 18 and 19 both engage the blade 6 on the left side of the vehicle. The wheel 3 will now be in a set forward position. The second chuck 5 is now placed on the wheel 2 with its blade 6 extending forwardly and with the blade touching the pin 21. The knob 24 is now rotated until the pin 23 also touches the blade 6 and by reading the calibrations on the knob 24 it is possible to determine the amount of toe in or toe out of the wheels. The mechanic can then adjust the wheels for the proper amount of toe in. The rider 13 is slidable on the rail 8 and, therefore, this rider can be moved against the blade 6 on the right hand side of the vehicle after this blade has been positioned on the right wheel, as previously described.

If it is desired to reset the steering wheel for the straight ahead position, the chuck 5 is mounted on one wheel, for example, the left, and with the arm 6 extending forwardly. The rider 14 is now moved until both pins 18 and 19 engage the blade 6. The wheel 3 is now in straight forward position and the steering wheel can be adjusted, if desired.

Having described our invention, we claim:

1. A toe gauge for the front wheels of a vehicle, comprising a pair of blades, means removably securing a blade to the hub of a front wheel of the vehicle, each of said blades projecting forwardly of the wheels, a horizontal rail positioned in front of the wheels and extending transversely of the vehicle, a pair of spaced feet depending from the rail to support said rail in front of the wheels, a rider mounted on said rail, a pair of horizontally spaced pins on said rider, one of said blades engaging both of the pins to align said blade and the wheel to which it is attached, a second rider on said rail, a pair of horizontally spaced pins on the second rider, the second blade engaging both of said last named pins to align the second wheel, the second rider being slidably mounted longitudinally on the rail, one of the last named pins being adjustably mounted on the rider for longitudinal movement and the other of said last named pins being stationary relative to the blade.

2. A toe gauge for the front wheels of a vehicle, comprising a pair of blades, means removably securing a blade to the hub of a front wheel of the vehicle, each of said blades projecting forwardly of the wheels, a horizontal rail positioned in front of the wheels and extending transversely of the vehicle, a pair of spaced feet depending from the rail to support said rail in front of the wheels, a rider mounted on said rail, a pair of horizontally spaced pins on said rider, one of said blades engaging both of the pins to align said blade and the wheel to which it is attached, a second rider on said rail, a pair of horizontally spaced pins on the second rider, the second blade engaging both of said last named pins to align the second wheel, the second rider being slidably mounted longitudinally on the rail, one of the last named pins being adjustably mounted on the rider for longitudinal movement, said one of the last named pins being also calibrated to determine its projection beyond the rider, and the other of said last named pins being stationary relative to the blade.

DONALD H. SHOOTER.
JOHN H. BENDER.

REFERENCES CITED

The following references are of record in the file of this patent:

UNITED STATES PATENTS

| Number | Name | Date |
|---|---|---|
| 1,138,736 | Dedreux | May 11, 1915 |
| 1,449,289 | King | Mar. 20, 1923 |
| 1,569,119 | Feider | Jan. 12, 1926 |
| 1,663,452 | Hershman et al. | Mar. 20, 1928 |
| 2,000,993 | Schmidt | May 14, 1935 |
| 2,098,749 | Johnston | Nov. 9, 1937 |
| 2,190,709 | Friestedt | Feb. 20, 1940 |
| 2,235,383 | O'Donnell | Mar. 18, 1941 |
| 2,292,968 | Peters | Aug. 11, 1942 |
| 2,556,227 | Shaw | June 12, 1951 |

OTHER REFERENCES

Pub.: Form LA 1949, Kwick-Ezee, Inc., 17 W. 60th Street, N. Y., N. Y.